Dec. 7, 1954   E. A. NEUGASS   2,696,550
INSTRUMENT LIGHTING

Filed Nov. 26, 1951   2 Sheets-Sheet 1

INVENTOR.
EDWIN A. NEUGASS.
BY
Maxwell E. Sparrow
ATTORNEY

INVENTOR.
EDWIN A. NEUGASS.
ATTORNEY.

United States Patent Office 2,696,550
Patented Dec. 7, 1954

2,696,550

INSTRUMENT LIGHTING

Edwin A. Neugass, White Plains, N. Y.

Application November 26, 1951, Serial No. 258,214

6 Claims. (Cl. 240—2.1)

The present invention relates generally to devices for lighting instruments, and is particularly related to devices for externally illuminating the faces of instruments which are enclosed in sealed cases.

Many instruments, for example, aircraft instruments, are provided in sealed cases with the indicating faces thereof positioned behind fixed glass. Heretofore, the faces of such instruments have been given a black matte finish with the indicia and indicating hands being coated with fluorescent or phosphorescent pigments of a light color which glow when subjected to ultra-violet radiation. Such instruments have been illuminated by a source of ultra-violet radiation directed at the faces thereof to cause the pigmented indicia and indicating hands to glow. However, when this form of instrument illumination is employed in the cockpit or control station of an airplane and the like, the glow emitted from the fluorescent or phosphorescent pigments, which glow lingers after the source of ultra-violet radiations has been deenergized or removed, has an adverse effect upon the dark adaptation of the pilot's eyes.

It is known that the dark adaptation of the pilot's eyes is not impaired by red light, and it is therefore the principal object of the present invention to provide devices for illuminating the faces of sealed instruments of the described character with red light.

Another object is to provide devices for illuminating the faces of sealed instruments of the described character which are effective to direct red light against the faces of the related instruments so that the indicia and hands of the latter reflect the red light toward the observer and in a manner to prevent the escape of any light, other than such reflected red light, toward the observer.

A further object is to provide illuminating devices having the aforementioned characteristics which are constructed so that the faces of the related instruments are visible along lines of sight which form angles of at least 30° with the perpendiculars to the faces of the instruments.

In accordance with the present invention, the above objects are accomplished by providing a panel of transparent plastic mounted in front of the instrument. With the exception of the portion of the plastic panel overlying the face of the instrument, the front and rear faces of the panel, as well as the edges of the latter, are covered first with a layer of light-colored material and then with an outer layer of dark, preferably black, opaque material to prevent escape of light from the portions of the panel covered thereby. A light emitting source, encased in a red-colored filter, is mounted within the transparent plastic panel, at the center of the latter, to emit light radially from the center to all parts of the panel. In one embodiment of the invention, the light source is energized by a pair of thin electrical conductors extending over the surface of the panel from the periphery toward the center thereof. In another embodiment of the invention, the front and rear surfaces of the plastic panel are coated with transparent, electrically conducting layers to transmit electrical energy from suitable terminals at the periphery of the panel to the light source at the center.

The above, and other objects, features and avantages of the present invention will be manifest in the following detailed description of preferred illustrative embodiments thereof when read in connection with the accompanying drawings, forming a part of this specification, and wherein.

Figure 1:
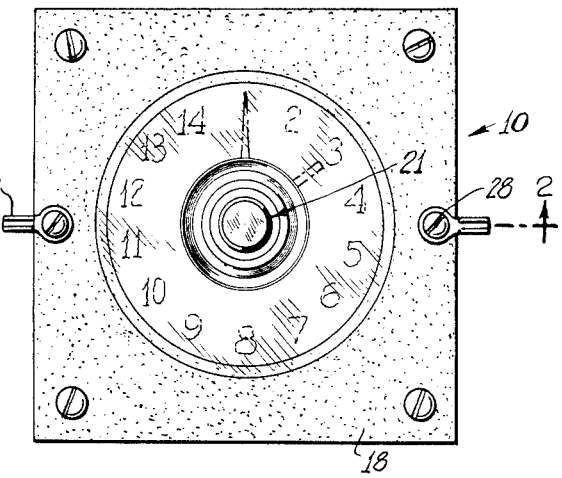
Fig. 1 is a front elevational view of an illuminating device constructed in accordance with an embodiment of the present invention and shown mounted in front of an instrument having a sealed casing.
Figure 2:
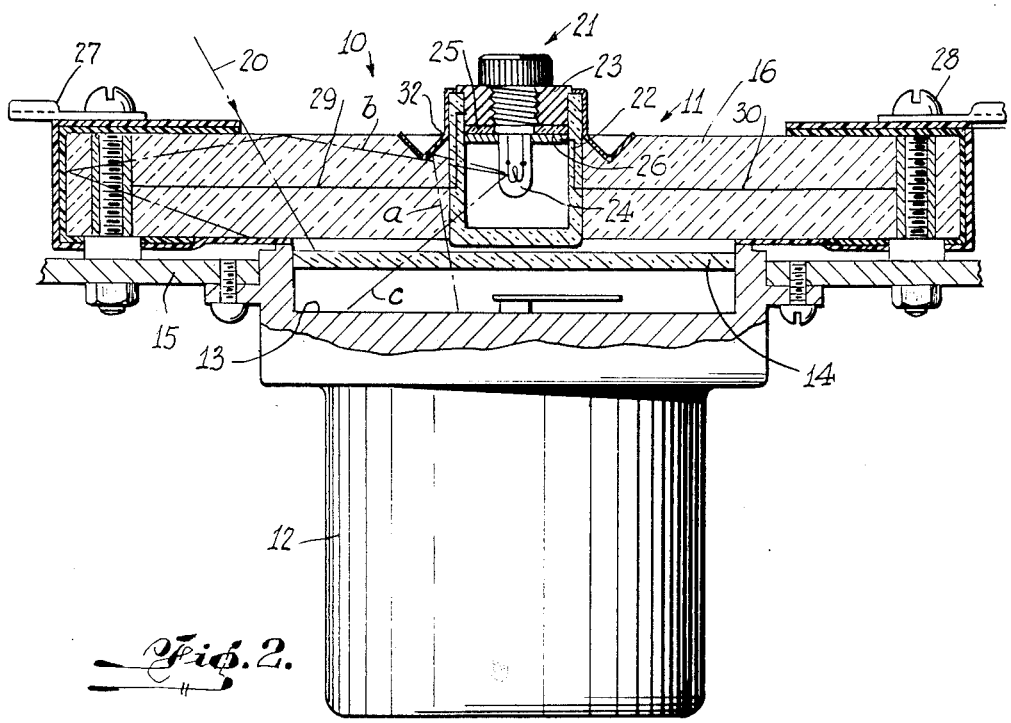
Fig. 2 is a horizontal sectional view taken along the line 2—2 of Fig. 1.

Referring to the drawings in detail, and initially to Figs. 1 and 2 thereof, an illuminating device, generally identified by the numeral 10 and constructed in accordance with an embodiment of the present invention, is there shown. The illuminating device 10 includes a panel, generally indicated by the numeral 11, which is mounted before, or in front of, an instrument 12 (Fig. 2) having a sealed case and an indicating face 13 which is positioned in back of a fixed glass 14. The instrument 12 is mounted in a conventional manner upon a metal instrument panel 15 and projects forwardly through a suitable opening in the latter.

The panel 11 (Figs. 2 and 3) includes a core or body 16 of transparent material, preferably plastic, for example, methyl-methacrylate, which has a central opening 17 extending therethrough. When the instrument to be illuminated has a circular face, a circular area at the center of each face of the body 16 is polished and left bare, while the remainder of the front face of the body 16 is covered with a light colored, preferably white, layer 18 and an outer layer of dark colored, preferably black, layer 19 of opaque material. The edges of the transparent body 16 are similarly covered by white and black layers 18a and 19a, respectively, which are continuations of the layers 18 and 19 at the front face of the body 16. The white layer 18a at the edges of the body 16 is continued over the rear surface of the latter as at 18b, while the outer, black and opaque layer 19a is continued over the layer 18b, as at 19b. It will be noted that the outer layer 19b extends further toward the center of the panel 11 than do the layer 18b and the layers 18 and 19, and that the layer 18b terminates closer to the edge of the panel than do the layers 18 and 19. Thus, when the panel 11 is viewed from the front, the layer 19b of dark, and hence non-reflecting material, defines a circular area of substantially the same diameter as the face 13 of the instrument 12 through which the latter may be viewed, while the layers 18 and 19 at the front of the panel define a circular area, of a diameter greater than that of the instrument face, so that the latter is visible even when viewed along lines disposed at substantial angles from the axis of the instrument, for example, the line 20 which is inclined at least 30° from the axis of the instrument. Further, since the white layer 18b is cut back relative to the edges of the layers 18 and 19, the first mentioned white layer will normally not be visible from the front.

While the layers 18, 18a, 18b, 19, 19a and 19b may be formed of suitable paints which are brushed or sprayed on the body 16, in the event that it is desired to provide illuminated indicia (not shown) at the front of the panel 11, the inner white layers are preferably formed of a translucent plastic material and the outer black layers are preferably formed of an opaque plastic material, applied in the manner and of the materials detailed in United States Letters Patent No. 2,518,726, so that, when openings are cut through the opaque layer at the front to define indicia, the translucent layer will be transilluminated at the portions underlying such openings by light transmitted through the transparent body 16.

The body 16 of the panel 11 is illuminated by a light assembly, generally indicated by the numeral 21. The assembly 21 includes a red-colored transparent filter 22 which is cup shaped and fits into the opening 17 at the center of panel 11 with its closed end or bottom facing toward the face of the instrument 12. A metal bushing 23 is secured in the filter 22 adjacent the open end of the latter and is formed with internal threads for receiving the threaded base of an incandescent light bulb 24. An insulating washer or spacer 25 separates the inner end of the bushing 23 from an annular contact disc 26 fixed within the filter 22. The bulb 24 is constructed so that the shell of the base thereof makes electrical contact with the bushing 22 while an end contact of the bulb engages against the disc 26.

In order to provide for the energization of the light bulb 24, two terminals 27 and 28 are mounted on the panel 11 adjacent the opposite side edges thereof. A thin conducting wire 29, preferably embedded within the transparent plastic body 16, extends from the terminal 27 inward and through the filter 22 to the bushing 23, while another thin conducting wire 30, also preferably embedded within the body 16, extends from the terminal 28 and through the filter 22 to the contact disc 26. Thus, when the terminals 27 and 28 are connected in an electric circuit, the light bulb 24 is energized to emit light rays through the filter 22 and into the transparent body 16.

Since the filament of the bulb 24 may be considered a point source of light, light rays will be emitted therefrom in all directions, for example, the rays $a$, $b$ and $c$. Since it is desirable that no light be projected from the body 16 forwardly toward the observer, except the light reflected from the indicia and hands at the instrument face 13, provision is made for trapping those light rays which would otherwise impinge against the front face of the exposed portion of the body 16 at an angle great enough to permit the escape of such rays from the body. Such rays are trapped by an annular groove 31 (Fig. 3) of V-shaped cross-section formed in the front face of the body 16 concentric with the opening 17. The surfaces of the groove 31, as well as the adjacent outer surfaces of the filter 22 are covered with a layer 32 of dark, preferably black, opaque material, such as, for example, paint. If desired, a layer (not shown) of white, light reflecting material may be provided under the opaque layer 32 to cause reflection of the trapped light rays. Thus, the ray $a$, directed forwardly, impinges against the inner face of the groove 31 which acts as a light hurdle and is either trapped or reflected rearwardly against the instrument face. The ray $b$ which just passes by the bottom of groove 31, impinges against the front face of the transparent body 16 at a flat angle so that it is reflected back into the body. Rays, such as the ray $c$, which are directed rearwardly and impinge against the rear surface of the body 16 at a sufficiently large angle, escape from that surface to illuminate the face 13 of the instrument with red-colored light.

Figure 3:
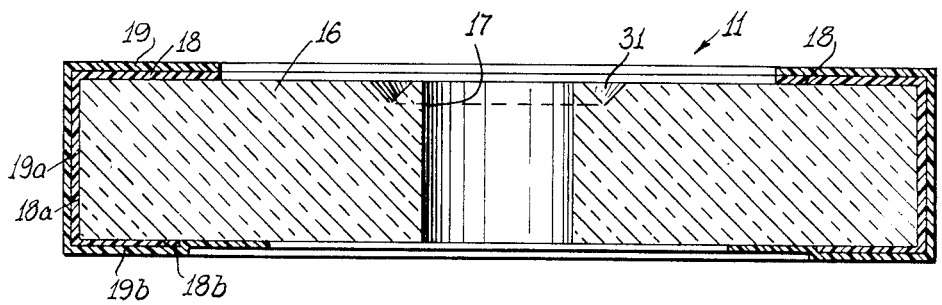
Fig. 3 is a horizontal sectional view of an element included in the illuminating device of Fig. 1.
Figure 4:
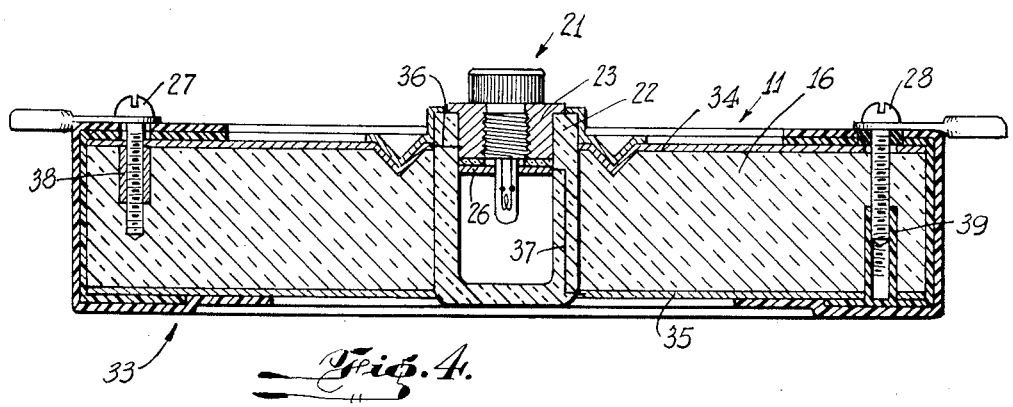
Fig. 4 is a sectional view, similar to Fig. 2, but showing an illuminating device constructed in accordance with another embodiment of the present invention.

Referring now to Fig. 4, wherein the reference numerals employed in Figs. 1, 2 and 3 are used to identify the same parts, an illuminating device, generally identified by the numeral 33, is there shown to be similar to that previously described with the exception of the means provided for transmitting the electrical current from the terminals 27 and 28, mounted near the opposite side edges of the panel 11, to the bushing 23 and contact disc 26 of the light bulb assembly 21 at the center of the panel. In place of the thin wires 29 and 30 provided in the embodiment of Figs. 1, 2 and 3 for the above purpose, the embodiment illustrated in Fig. 4 utilizes electrically conducting, transparent layers 34 and 35 applied to the front and rear surfaces, respectively, of the plastic, and hence insulating body 16. The transparent conducting layers 34 and 35 may be formed of chromium and the like sputtered on the front and rear surfaces of the body 16. A suitable wire 36, extending through the filter 22, connects the layer 34 to the bushing 23, while another wire 37 connects the layer 35 to the contact disc 26. The terminal 27 includes a screw or pin engaging in a terminal bushing 38 which has electrical contact with the layer 34, while the terminal 28 includes a pin or screw engaging in a similar terminal bushing 39 which is electrically connected to the layer 35.

From the foregoing description of illustrative examples, it is apparent that the present invention provides devices for illuminating instruments in sealed cases with red-colored light, and that such devices, necessarily independent of the related instruments, permit viewing of the latter from a wide range of points of view without producing a glare directed at the observer and without impairing the dark adaptation of the observer's eyes. Further, while only one illuminating device is shown associated with a single instrument, the square configuration of the panels 11 permits the side-by-side arrangement of a plurality of such panels for the purpose of illuminating a series of instruments, such as are usually mounted on an aircraft instrument panel.

While I have illustrated preferred embodiments of the invention, it is to be understood that the illustrated and described constructions are presented by way of example only, and that many modifications and changes, obvious to one skilled in the art, may be effected therein without departing from the spirit or scope of the invention as defined in the appended claims.

What I claim is:

1. An instrument illuminating device comprising a sheet of light transmitting material mounted in front of an instrument face; light emitting means disposed centrally in said sheet and constructed and arranged to direct light rays rearwardly toward the instrument face therebehind and radially outward into said sheet of light transmitting material; masking means on the edges and on portions of the front and rear surfaces of said sheet defining uncovered areas of said surface through which the instrument face may be viewed; said masking means including a light colored layer of material superposed directly on said sheet of light transmitting material and an outer layer of opaque dark colored material on said light colored layer, said dark colored layer at the rear surface of said sheet defining an uncovered area substantially the size of the instrument face to be viewed therethrough and extending further inward toward the center of the sheet than the edge of said light colored layer at the rear surface of the sheet, and said light and dark colored layers at the front surface of said sheet defining an uncovered area larger than said uncovered area defined by said dark colored layer at the rear surface which extends further inward toward the center of said sheet than said edge of said light colored layer at said rear surface of the sheet, so that the instrument face may be viewed along lines forming substantial angles with the axis of the instrument and the portion of the dark colored layer at said rear surface which extends beyond the related light colored layer absorbs light impinging thereagainst to prevent the reflection of such light forwardly through the uncovered area at the front surface of said sheet; and light hurdle means at the front of said sheet around said central light emitting means constructed to intercept rays of light directed radially and toward said front surface of the sheet at an angle thereto sufficiently large to permit escape of such rays forwardly from said light transmitting sheet.

2. An instrument illuminating device according to claim 1; wherein said light hurdle means includes an annular groove formed in said front surface of said sheet concentric with said light emitting means, and a layer of dark colored opaque material covering the surfaces of said groove.

3. An instrument illuminating device according to claim 1; wherein said sheet has a central opening extending therethrough, and said light emitting means includes a red colored transparent filter member of cup shaped configuration positioned in said opening with the bottom of said member facing in the direction of said rear surface of the sheet, socket means in said filter member including two contacts, a light bulb in said socket means extending into said filter member and effecting electrical contact with said two contacts, a pair of terminals adjacent the edge portion of said sheet, and electrical conducting means extending inwardly from said terminals to said contacts.

4. An instrument illuminating device according to claim 3; wherein said sheet of light transmitting material is formed of plastic; and said electrical conducting means includes thin wires of conducting material embedded in said plastic sheet and connected at their opposite ends to the respective terminals and contacts.

5. An instrument illuminating device according to claim 3; wherein said electrical conducting means includes layers of transparent electrically conducting material on the front and rear surfaces of said sheet; means connecting one of said layers of transparent, electrically conducting material to one of said terminals and to a related one of said contacts, and means connecting the other of said layers of transparent, electrically conducting material to the other of said terminals and to the remaining contact.

6. An instrument illuminating device according to claim 5; wherein said transparent, electrically conducting layers are formed of a sputtered metal.

References Cited in the file of this patent

UNITED STATES PATENTS

| Number | Name | Date |
|---|---|---|
| 2,128,246 | Hardesty | Aug. 30, 1938 |
| 2,172,765 | Kollsman | Sept. 12, 1939 |
| 2,401,867 | Grimes | June 11, 1946 |
| 2,429,240 | McMaster | Oct. 21, 1947 |
| 2,518,726 | Shlenker | Aug. 15, 1950 |
| 2,566,026 | Hughes, Jr. | Aug. 28, 1951 |
| 2,599,710 | Hathaway | June 10, 1952 |
| 2,637,802 | Roper et al. | May 5, 1953 |

FOREIGN PATENTS

| Number | Country | Date |
|---|---|---|
| 236,863 | Great Britain | July 16, 1925 |
| 492,258 | Great Britain | Sept. 12, 1938 |